US011885246B2

(12) United States Patent
Krieger et al.

(10) Patent No.: US 11,885,246 B2
(45) **Date of Patent: *Jan. 30, 2024**

(54) ENGINE VALVE WITH RAISED RING OR DIMPLE

(71) Applicant: Caterpillar Inc., Peoria, IL (US)

(72) Inventors: Jeffrey Clark Krieger, Brimfield, IL (US); Michael D. Roley, Washington, IL (US); Kyle Michael Rader, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/503,597

(22) Filed: Oct. 18, 2021

(65) Prior Publication Data

US 2022/0034243 A1 Feb. 3, 2022

Related U.S. Application Data

(63) Continuation of application No. 16/717,428, filed on Dec. 17, 2019, now Pat. No. 11,215,092.

(51) Int. Cl.

| | |
|---|---|
| ***F01L 3/20*** | (2006.01) |
| ***F01L 3/02*** | (2006.01) |
| ***B21K 1/22*** | (2006.01) |
| ***F01L 3/06*** | (2006.01) |
| ***F02F 1/24*** | (2006.01) |

(52) U.S. Cl.

CPC .................. *F01L 3/20* (2013.01); *F01L 3/02* (2013.01); *B21K 1/22* (2013.01); *F01L 3/06* (2013.01); *F01L 2301/00* (2020.05); *F01L 2303/00* (2020.05); *F02F 2001/245* (2013.01)

(58) Field of Classification Search

CPC ......... F02F 2001/245; F01K 3/06; F01L 3/02; F01L 3/20; F01L 2301/00; F01L 2303/00; B21K 1/22

See application file for complete search history.

(56) References Cited

U.S. PATENT DOCUMENTS

| | | | | |
|---|---|---|---|---|
| 4,779,584 A | | 10/1988 | Mosler | |
| 4,815,706 A | | 3/1989 | Feuling | |
| 4,938,181 A | | 7/1990 | Holmer | |
| 4,976,248 A | | 12/1990 | Rowe | |
| 5,081,965 A | * | 1/1992 | Walters ..................... | F01L 3/20 123/188.2 |

(Continued)

FOREIGN PATENT DOCUMENTS

| | | |
|---|---|---|
| DE | 102006061128 A1 | 6/2008 |
| EP | 0369967 A1 | 1/1994 |

(Continued)

*Primary Examiner* — Kevin A Lathers

(74) *Attorney, Agent, or Firm* — Brannon Sowers & Cracraft PC

(57) ABSTRACT

An engine valve includes a stem, a head comprising an outer lip surface, a seating surface extending from the outer lip surface toward the stem, and a combustion surface extending from the outer lip surface on the opposite side of the head as compared to the seating surface. The combustion surface includes a first convex arcuate surface spaced away from the outer lip surface, at least partially forming a raised ring, and a first concave arcuate surface spaced away from the outer lip surface, at least partially forming a dimple.

20 Claims, 10 Drawing Sheets

(56) References Cited

U.S. PATENT DOCUMENTS

| | | | | |
|---|---|---|---|---|
| 5,485,815 | A | 1/1996 | Shida | |
| 7,240,895 | B2 | 7/2007 | Abele et al. | |
| 11,215,092 | B2 * | 1/2022 | Krieger | F01L 3/02 |
| 2001/0002041 | A1 | 5/2001 | Hayakawa et al. | |
| 2007/0040144 | A1 * | 2/2007 | Abele | F01L 3/20<br>251/356 |
| 2017/0152768 | A1 * | 6/2017 | Qu | F01L 3/06 |
| 2019/0063271 | A1 | 2/2019 | Schlee | |
| 2020/0023729 | A1 | 1/2020 | Motin et al. | |

FOREIGN PATENT DOCUMENTS

| | | | |
|---|---|---|---|
| EP | 1643087 | A1 | 4/2006 |
| GB | 1217265 | A | 12/1970 |
| JP | 6147699 | B2 | 6/2017 |
| WO | 2015187034 | A1 | 12/2015 |

* cited by examiner

ENGINE VALVE WITH RAISED RING OR DIMPLE

CROSS-REFERENCE TO RELATED APPLICATION(S)

This is a continuation application claiming benefit of application Ser. No. 16/717,428, filed on Dec. 17, 2019, having the same title, and the content of which is hereby incorporated herein by reference in its entirety.

TECHNICAL FIELD

The present disclosure relates generally to engine valves and associated hardware, and more particularly to an engine valve that is less prone to high and low cycle fatigue problems.

BACKGROUND

Gas exchange valves are used in internal combustion engines to control fluid connections between the cylinder and a supply of intake air or intake air and other gases such as recirculated exhaust gas, or between the cylinder and an exhaust manifold for expelling combustion products during operation. Designs are known wherein a single intake valve and a single exhaust valve are associated with each cylinder in an engine, as well as designs where multiple gas exchange valves of each respective type are associated with each cylinder. A camshaft, typically rotated at half engine speed, is coupled with valve lifters, bridges, rocker arms, and/or other equipment for controlling the opening and closing of gas exchange valves at appropriate engine timings.

Gas exchange valves are moved out of contact with and into contact with the engine head or a valve seat insert within the engine head to affect their opening and closing actions. Gas exchange valves may be moved between their open and closed positions with significant mechanical forces. The in-cylinder environment is associated with combustion temperatures of several hundred degrees along with relatively high pressures. These and other factors contribute to gas exchange valve operating conditions being quite harsh.

More specifically, modern heavy-duty diesel engine manufacturers are in a competitive market where low cost, power dense engine solutions are the norm. This has led to the down-sizing of engine displacement for existing output levels, or increased output levels for existing engine displacements. The decreased engine displacement or increased engine output results in higher pressures and temperatures inside the cylinder. These higher pressures and temperatures apply greater demands on the valves within the cylinder head. The valves have several failure modes, including high cycle fatigue, low cycle fatigue, and seat face wear (valve recession), etc.

These problems may necessitate maintenance of the engine and unwanted downtime for a machine or economic endeavor employing the engine.

Published PCT Patent Application No. WO2015/187034A1 discloses an inlet valve with an ellipsoidal flow separation surface running downstream from an end of the seating surface to an underside of the valve seat. However, this reference fails to disclose how to improve the longevity of an engine valve.

SUMMARY OF THE INVENTION

In one aspect, an engine head assembly for an internal combustion engine comprises an engine head having a fluid conduit formed therein and an engine valve. The engine valve may include a stem, a head comprising an outer lip surface, a seating surface interposed between the stem and the outer lip surface, and a combustion surface extending from the outer lip surface on the opposite side of the head as compared to the seating surface. The combustion surface may include a first convex arcuate surface spaced away from the outer lip surface, at least partially forming a raised ring, and a first concave arcuate surface spaced away from the outer lip surface, at least partially forming a dimple.

In another aspect, an engine valve may comprise a body of revolution, defining an axis of revolution, a radial direction perpendicular to the axis of revolution, and a circumferential direction about the axis of revolution. The body of revolution may include a stem, a head comprising an outer lip surface, a seating surface extending radially and axially inwardly from the outer lip surface toward the stem, and a combustion surface extending from the outer lip surface on the opposite side of the head as compared to the seating surface. The combustion surface may include a first convex arcuate surface spaced away from the outer lip surface, at least partially forming a raised ring extending circumferentially about the axis of revolution, a first planar surface extending radially inwardly from the outer lip surface toward the first convex arcuate surface and perpendicularly to a direction parallel with the axis of revolution.

In yet another aspect, an engine valve may comprise a body of revolution, defining an axis of revolution, a radial direction perpendicular to the axis of revolution, and a circumferential direction about the axis of revolution. The body of revolution may include a stem, a head comprising an outer lip surface, a seating surface extending radially and axially inwardly from the outer lip surface toward the stem, and a combustion surface extending from the outer lip surface on the opposite side of the head as compared to the seating surface. The combustion surface may include a first concave arcuate surface centered on the axis of revolution at a trough point, the first concave arcuate surface extending circumferentially about the axis of revolution, at least partially forming a dimple, a conical surface or a planar surface extending radially away from the first concave arcuate surface, and a convex transitional surface connecting the conical surface and the first concave arcuate surface.

DETAILED DESCRIPTION

Figure 1:
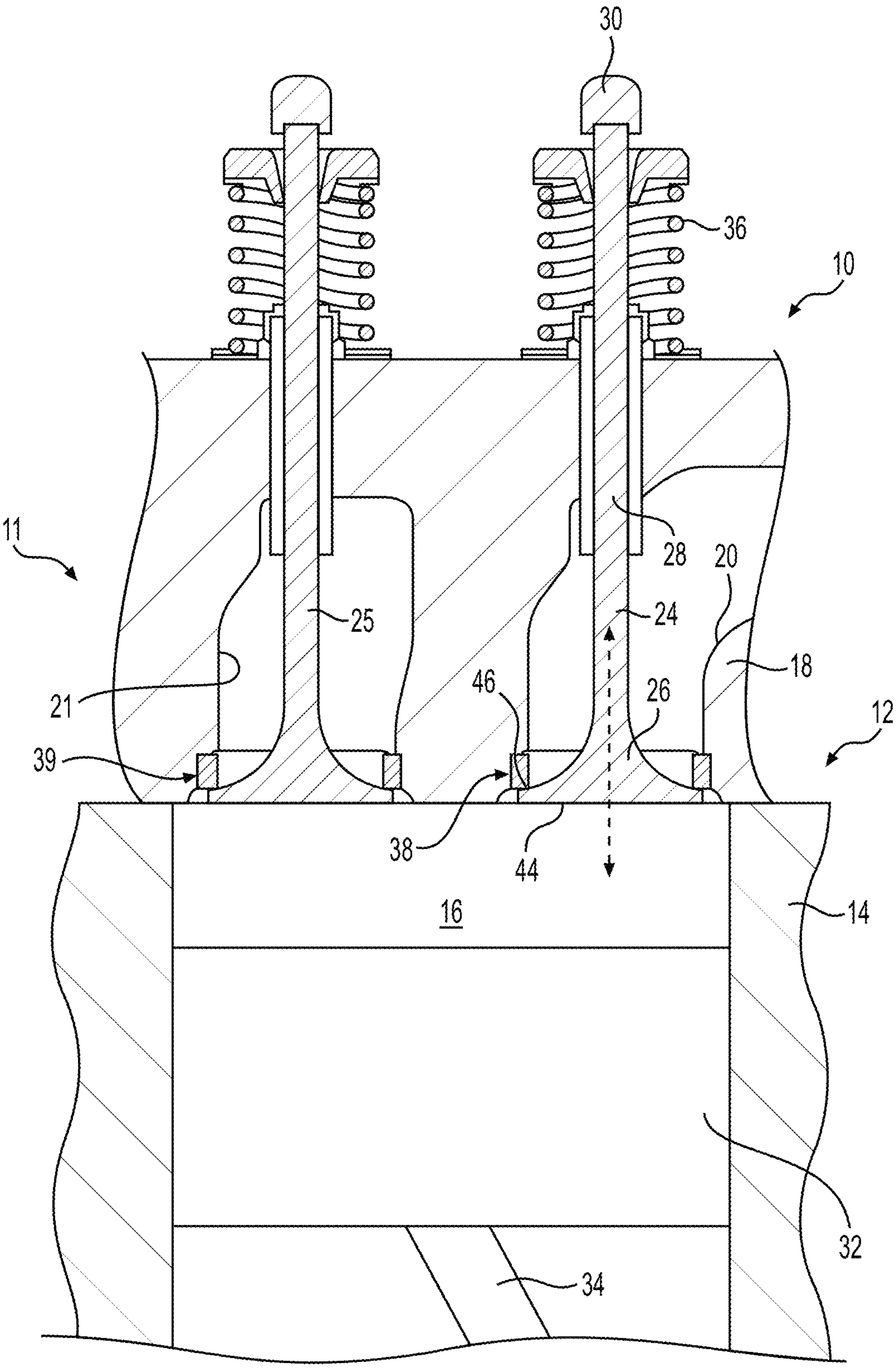
FIG. 1 is a sectioned side diagrammatic view of an internal combustion engine, according to one embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100"etc. It is to be understood that the use of letters or primes immediately after a reference number indicates that these features are similarly shaped and have similar function such as is often the case when geometry is mirrored about a plane of symmetry. For ease of explanation in this specification, letters or primes will often not be included herein but may be shown in the drawings to indicate duplications of features discussed within this written specification.

Referring to FIG. 1, there is shown an internal combustion engine according to one embodiment and including an engine housing 12 having a cylinder block 14 with a cylinder 16 formed therein. Internal combustion engine 10 (hereinafter "engine 10") could be any of a variety of engines including a compression ignition diesel engine, a spark-ignited gasoline engine, a gaseous fuel engine structured to operate on a fuel that is gaseous at standard temperature and pressure, a dual fuel engine, or still another. In a compression ignition diesel engine application, such as a direct-injected diesel engine, suitable fuels could include diesel distillate fuel, biodiesel, blends of these, or still others. For the embodiments discussed herein in particularity, the engine may be any type of internal combustion engine.

An engine head 18 is coupled to cylinder block 14 and has a first gas exchange conduit 20 and a second gas exchange conduit 21 formed therein. Gas exchange conduits 20 and 21 could each or either be an intake conduit structured to fluidly connect with an intake manifold or an exhaust conduit structured to connect with an exhaust manifold. In a practical implementation strategy, gas exchange conduit 20 is an intake conduit and gas exchange conduit 21 is an exhaust conduit.

A piston 32 is movable within cylinder 16 between a bottom dead center position and a top dead center position and is coupled to a crankshaft (not shown) by way of a connecting rod 34 in a generally conventional manner. Engine 10 could include any number of cylinders arranged in any suitable configuration such as a V configuration, an in line configuration, or still another. Engine head 18 could include a monolithic engine head associated with all of a plurality of the cylinders in engine 10, or could be one of a plurality of separate engine head sections each associated with less than all of the cylinders in engine 10.

Engine 10 further includes a first gas exchange valve 24, which can include an intake valve, and a second gas exchange valve 25, which can include an exhaust valve. Gas exchange valve 24, including aspects of its structure and operation, is discussed herein in the singular, however, it will be understood that the description of gas exchange valve 24 can apply by way of analogy to any other gas exchange valves within engine 10, except where otherwise indicated. Gas exchange valve 24 is shown more or less vertically oriented with respect to a direction of reciprocation of piston 32, however, it should also be appreciated that other configurations such as gas exchange valves at diagonal orientations are contemplated herein. Gas exchange valve 24 also includes a shaft or stem 28 connected to a valve head 26. A valve bridge 30 or the like may be coupled to gas exchange valve 24 such that gas exchange valve 24 can move together with another gas exchange valve (not shown) between open and closed positions, such as in response to rotation of a camshaft and movement of a rocker arm, a valve lifter assembly, and/or other equipment. A return spring 36 is coupled with gas exchange valve 24 in a generally conventional manner to bias the valve toward a closed position.

Engine 10 further includes an engine head assembly 11 formed by engine head 18 and a plurality of valve seat inserts 38 and 39 associated with gas exchange valves 24 and 25, respectively. Gas exchange valve 24, and by analogy other gas exchange valves of engine 10, are movable between a closed valve position and an open valve position. At the closed valve position an inner valve face 46 contacts valve seat insert 38, whereas gas exchange valve 25 contacts valve seat insert 39. At the closed position cylinder 16 is blocked from fluid communication with the corresponding gas exchange conduit 20 and 21. At the open valve position fluid communication exists. An outer valve face 44 or combustion face is oriented toward cylinder 16. As will also be further apparent from the following description, valve seat insert 38, and potentially also valve seat insert 39 is structured, together with the corresponding gas exchange valves 24 and 25, to slow and alter the nature of valve recession over the course of a service life or service interval of engine 10 and to provide intake gas flow properties at least as efficacious as known designs.

To that end, an engine valve that may be used in an engine head assembly for an internal combustion engine as described above herein will now be described with reference to FIGS. 2 thru 4.

Such an engine valve 100 may include a stem 102, a head 104 comprising an outer lip surface 106, a seating surface 108 (for contacting the valve seat insert) interposed between the stem 102 and the outer lip surface 106, and a combustion surface 110 (so called since this surface is intended to face the interior of the cylinder during combustion) extending from the outer lip surface 106 on the opposite side of the head 104 as compared to the seating surface 108.

Looking more closely at the combustion surface 110, this surface may include a first convex arcuate surface 112 that is spaced away from the outer lip surface 106, at least partially forming a raised ring 114. In addition to or in lieu of the raised ring 114, a first concave arcuate surface 116 may be provided that is spaced away from the outer lip surface 106, at least partially forming a dimple 118.

Sometimes, the engine valve 100 includes a body 120 of revolution (so called since the body may be modeled or fabricated by rotating a profile about an axis of revolution), defining an axis 122 of revolution, a radial direction 124 that is perpendicular to the axis 122 of revolution, and a circumferential direction 126 that is disposed about the axis 122 of revolution. Also, the combustion surface 110 may include both a raised ring 114 and a dimple 118 that extend circumferentially about the axis 112 of revolution simultaneously. In such a case, both the raised ring 114 and the dimple 118 may be concentric about the axis 122 of revolution.

Figure 4:
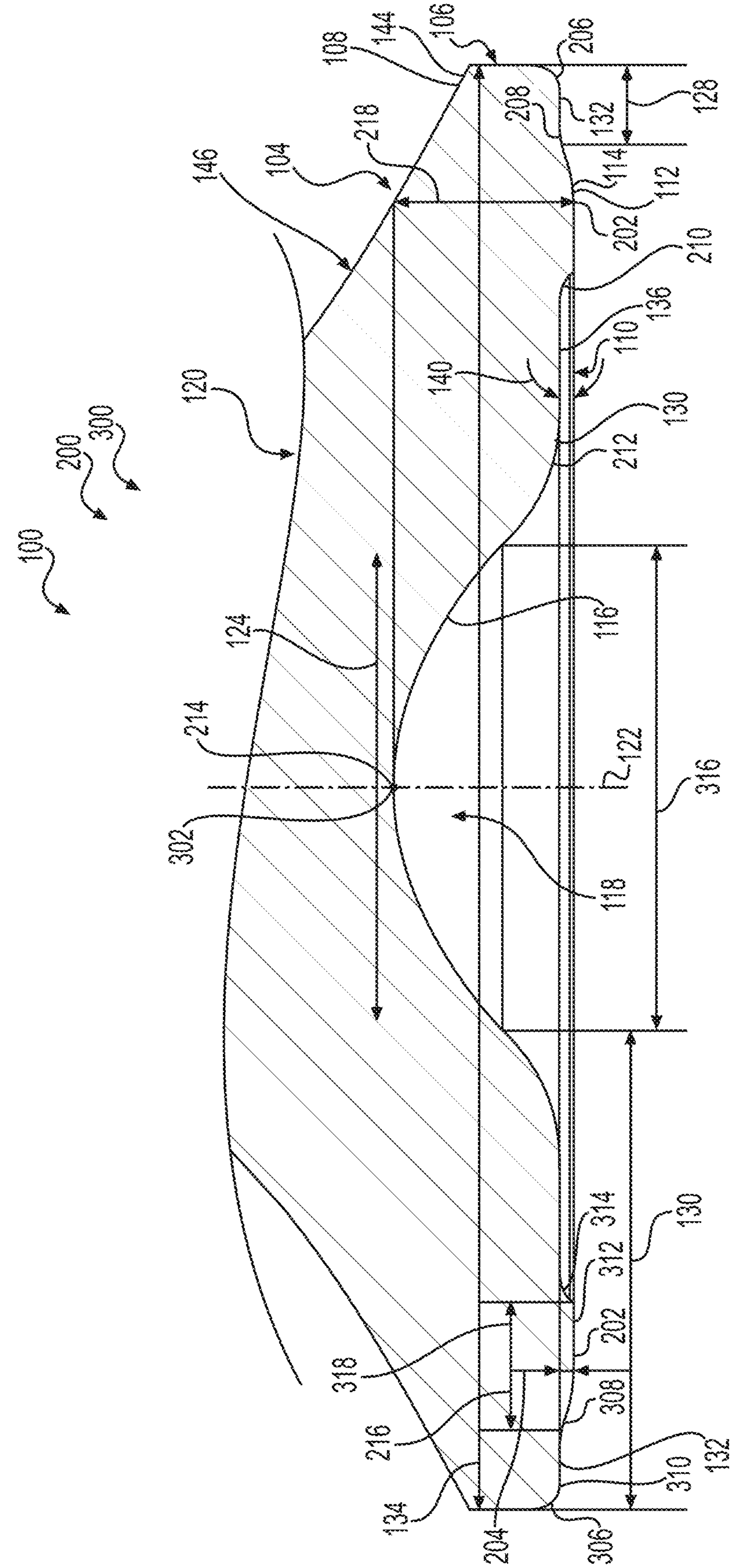
FIG. 4 is an enlarged detail view of the head of the engine valve of FIG. 3, showing its dimple and raised ring more clearly.

As best seen in FIG. 4, the first convex arcuate surface 112 may be spaced away a first radial distance 128 from the outer lip surface 106, and the first concave arcuate surface 116 is spaced away from the outer lip surface 106 a second radial distance 130 from the outer lip surface 106 that is greater than the first radial distance 128. Hence, the dimple 118 may be spaced away from the raised ring 114 toward the radial interior of the engine valve 100.

With continued reference to FIG. 4, the combustion surface 110 further comprises a first planar surface 132 that extends radially inwardly from the outer lip surface 106 toward the first convex arcuate surface 112. As shown in FIG. 4, the first planar surface 132 is perpendicular to a direction parallel to the axis 122 of revolution. This may not be the case for other versions of the engine valve 100.

In some cases, the outer lip surface 106 may define a head diameter 134, and a ratio of the head diameter 134 to the first radial distance 128 may range from 5.0 to 10.0.

With continued reference to FIG. 4, the combustion surface 110 may further comprise a first conical surface 136 extending radially and axially inwardly from the first convex arcuate surface 112 toward the first concave arcuate surface 116. A second convex arcuate surface 138 may connect the first conical surface 136 to the first concave arcuate surface 116.

Figure 11:
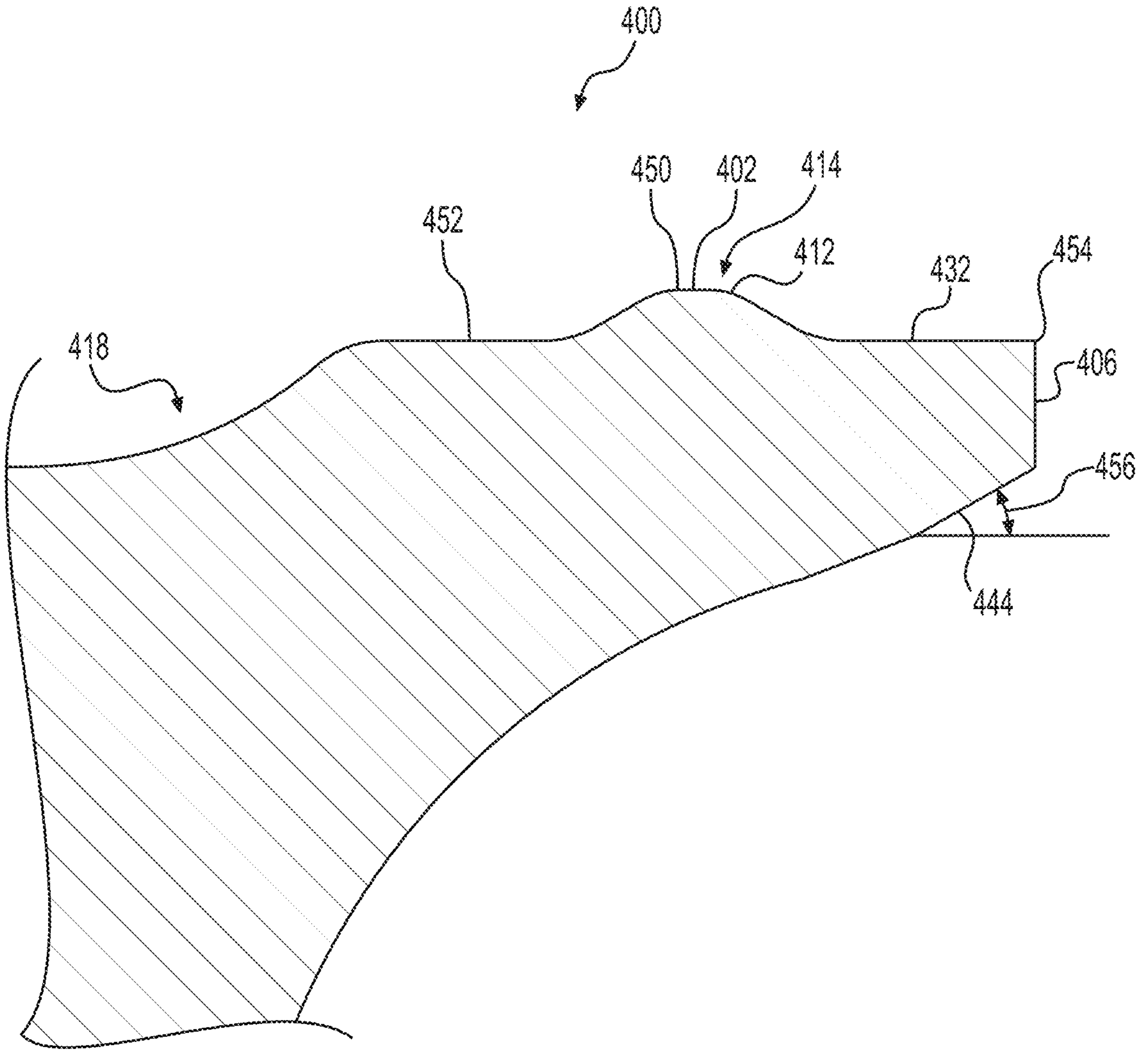
FIG. 11 is an enlarged detail view of the head of an engine valve according to a second embodiment of the present disclosure, wherein the head is inverted as compared to FIG. 4 and only half of the head is shown from the axis of rotation to the outer lip surface.
Figure 12:
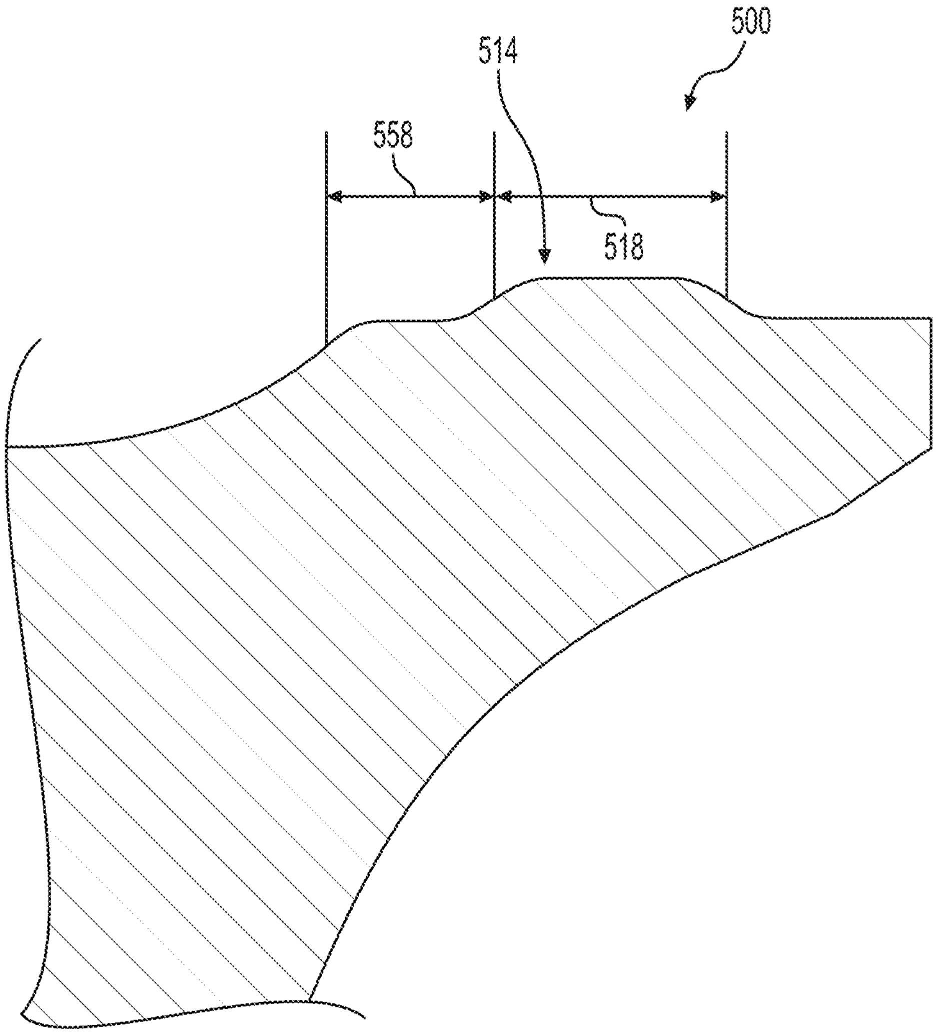
FIG. 12 is an enlarged detail view of the head of an engine valve according to a third embodiment of the present disclosure, depicted in a similar manner to that of FIG. 11.
Figure 13:
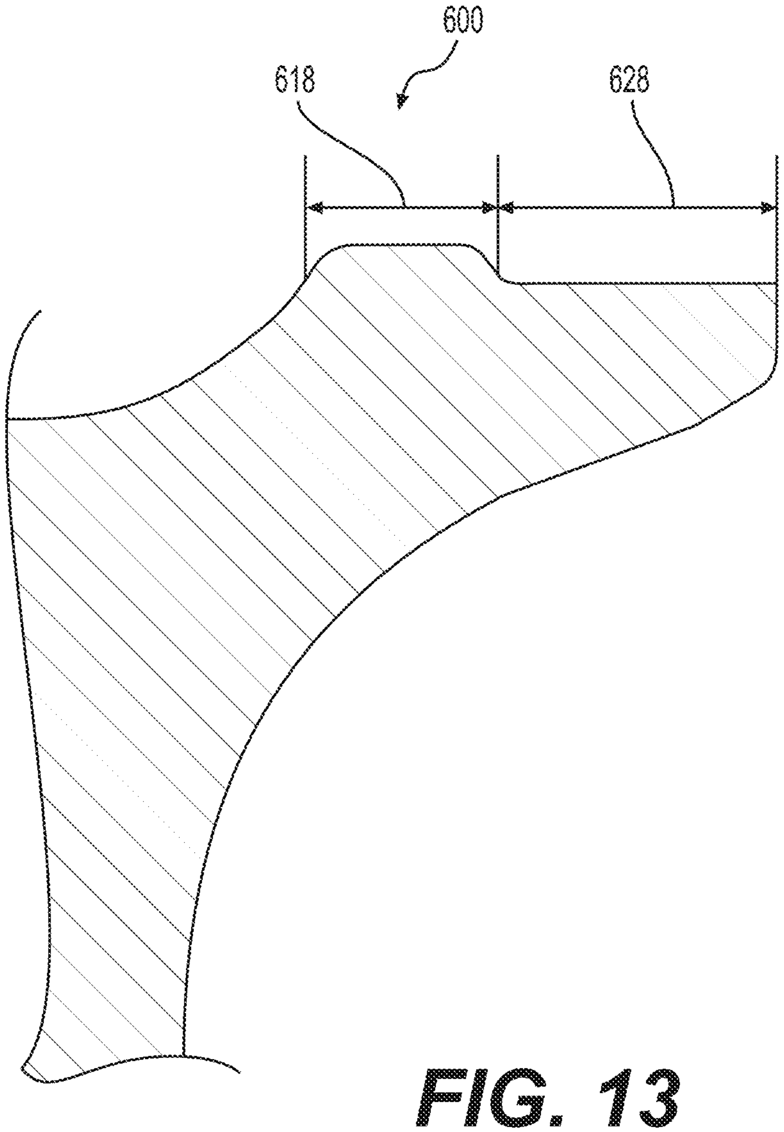
FIG. 13 is an enlarged detail view of the head of an engine valve according to a fourth embodiment, of the present disclosure, depicted in a similar manner to that of FIG. 11.

The first conical surface 136 is not perpendicular to a direction parallel to the axis 122 of rotation in the illustrated embodiments (it is to be understood that this first conical surface may be substituted with a second planar surface that is perpendicular to a direction that is parallel to the axis 122 of rotation in other embodiments of the present disclosure as shown in FIGS. 11 thru 13).

Consequently, the first conical surface 136 as seen in FIG. 4 may form an acute angle 140 with the radial direction 124 in a plane containing the radial direction 124 and the axis 122 of revolution. A ratio of the head diameter 134 to the second radial distance 130 may range from 2.5 to 3.0. The acute angle 140 may range from 10.0 degrees to 25.0 degrees, the first radial distance 128 may range from 3.0 mm to 12.0 mm, and the second radial distance may range from 12.0 mm to 25.0 mm in various versions of the engine valve 100.

Figure 2:
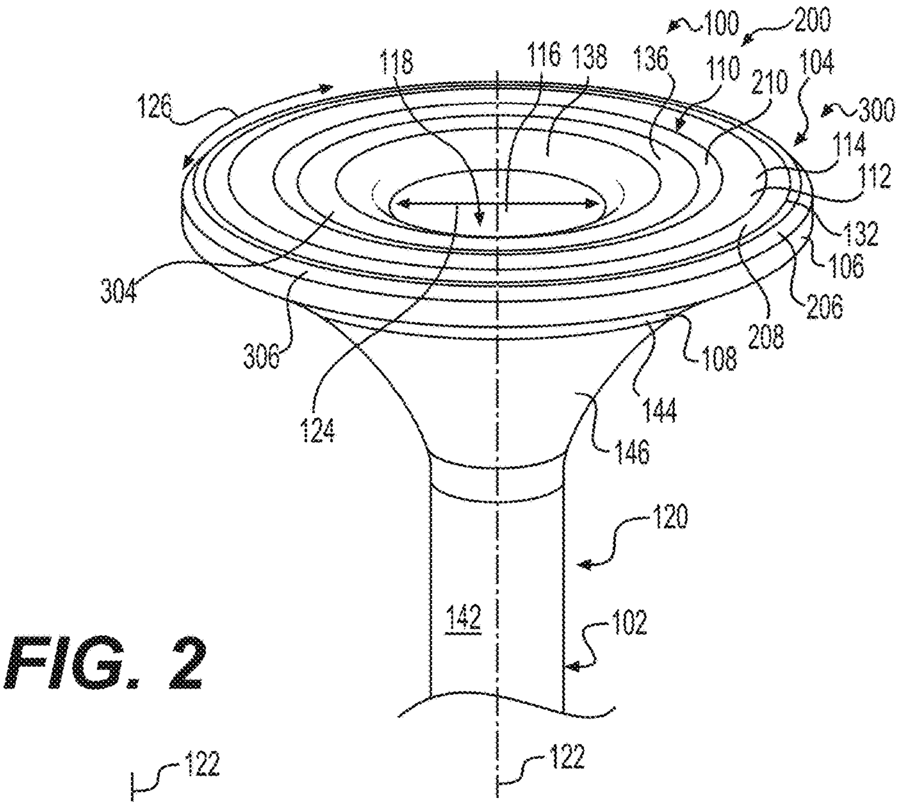
FIG. 2 is a pictorial view of a portion of an engine valve showing the underside of its head, according to one embodiment of the present disclosure that may be used in the internal combustion engine of FIG. 1.

In some cases as best seen in FIG. 2, the stem 102 includes a stem cylindrical surface 142, while the seating surface 108 includes a conical seating surface 144 extending radially inwardly from the outer lip surface 106 (similar statements apply to the embodiments of FIGS. 11 thru 13). An arcuate seating surface 146 may extend radially inwardly from the conical seating surface 144 to the stem cylindrical surface 142, and the outer lip surface 106 may also be cylindrical.

Figure 3:
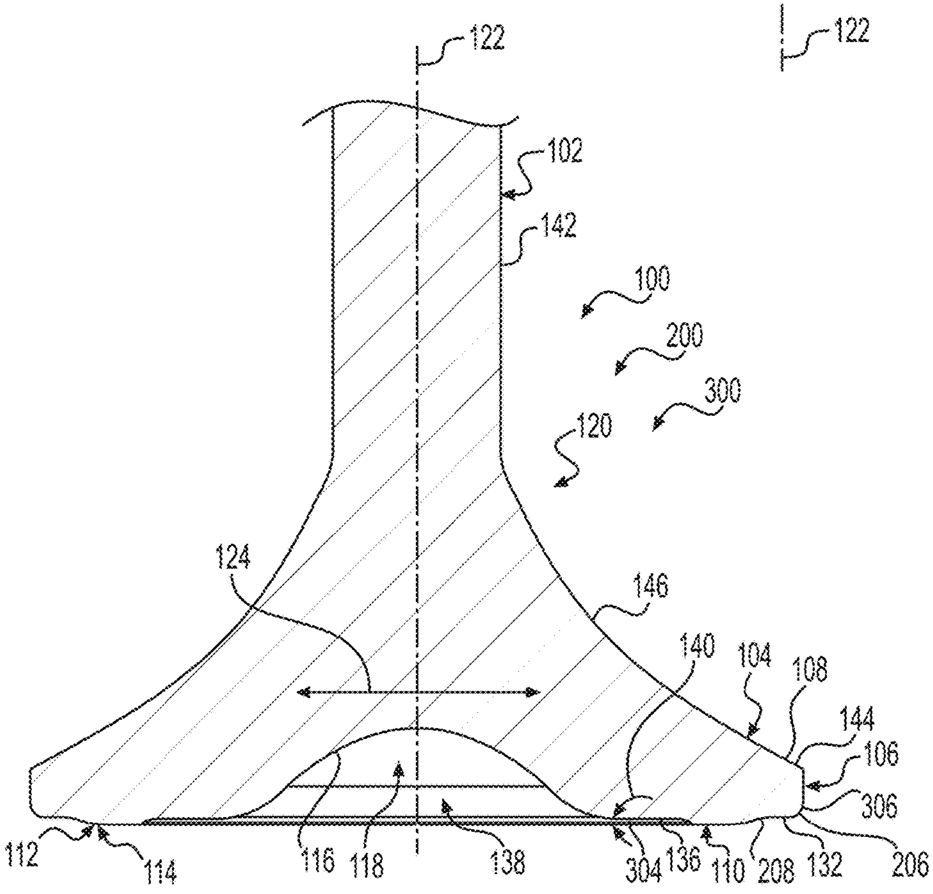
FIG. 3 is a sectioned view through the engine valve of FIG. 2.
Figure 5:
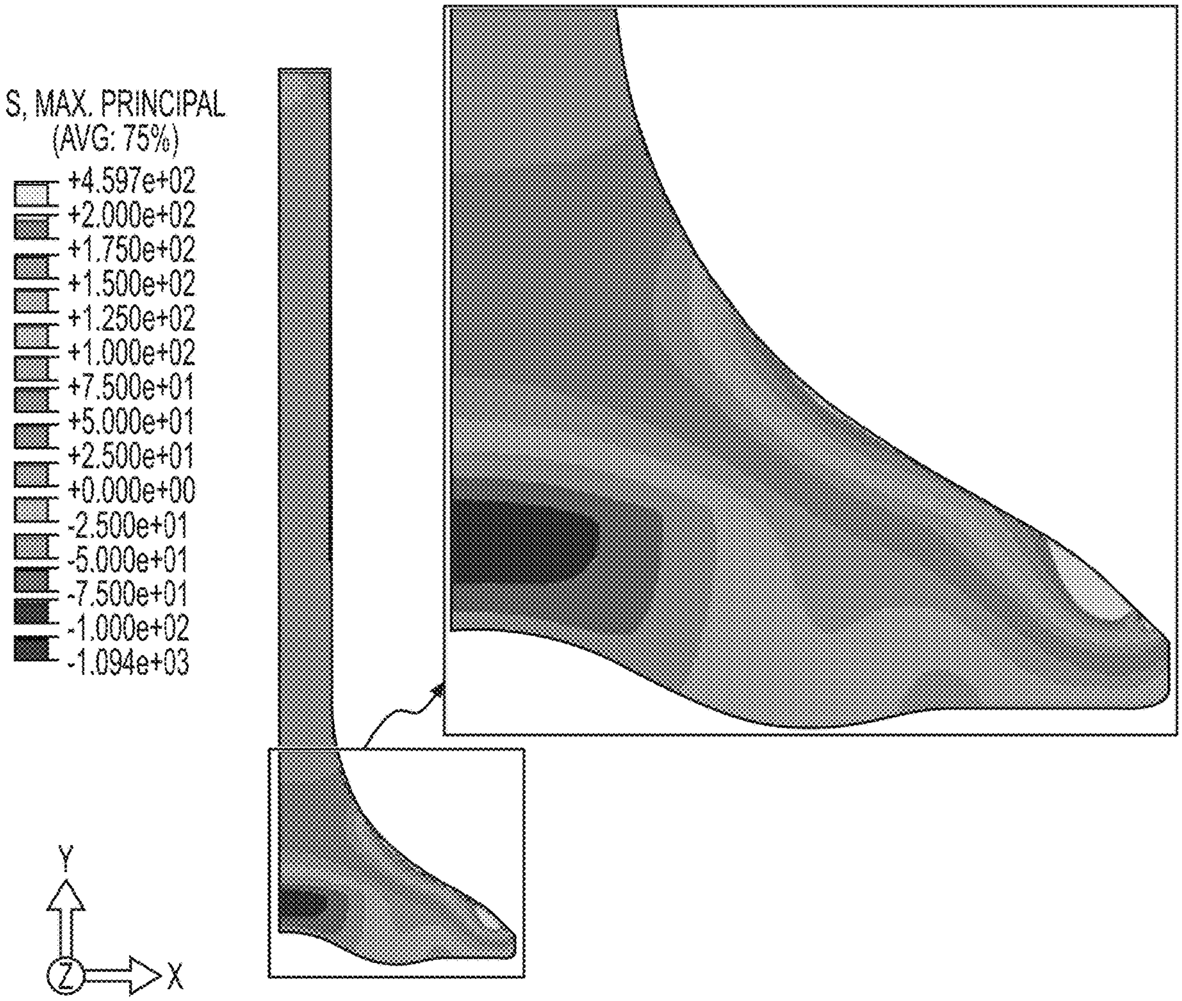
FIG. 5 is a finite element analysis (FEA) plot showing reduced maximum principal stress of half of the engine valve obtained using the engine valve of FIG. 2.

In FIGS. 3 thru 5, the raised ring is formed solely by a convex arcuate surface, but in the embodiments shown in FIGS. 11 thru 13, the raised ring may be formed by a plurality of segments including a flat apex surface that also at least partially defines an axial extremity along with the convex arcuate surface as will be discussed more thoroughly later herein.

Any of the aforementioned features may be differently configured including ratios, dimensions, shapes, etc. than what has been specifically mentioned herein.

Any engine valve discussed herein may be cast and machined and formed of a steel such as a high-alloy hardened steel or tool steel.

With continued reference to FIG. 4, an engine valve 200 that is particularly well suited as a replacement part will now be described.

The engine valve 200 may have a combustion surface 110 that includes a first convex arcuate surface 112 that is spaced away from the outer lip surface 106 a first radial distance 128, at least partially forming a raised ring 114 extending circumferentially about the axis 122 of revolution, and a first planar surface 132 extending radially inwardly from the outer lip surface 106 toward the first convex arcuate surface 112 and perpendicularly to a direction parallel with the axis 122 of revolution. Thus, the first planar surface 132 extends purely in the radial direction 124.

As alluded to earlier herein, the outer lip surface 106 defines a head diameter 134 (such as when the head 104 is circular), and a ratio of the head diameter 134 to the first radial distance 128 may range from 5.0 to 10.0. In such a case, the first radial distance 128 may range from 3.0 mm to 12.0 mm. Also, the first convex arcuate surface may terminate at an axial extremity 202 that is spaced an axial distance 204 away from the first planar surface. This axial distance 204 may range from 0.4 mm to 4.0 mm in various versions of the engine valve 200.

The combustion surface 110 may further comprise a first convex blend 206 connecting the outer lip surface 106 to the first planar surface 132, and a first concave blend 208 connecting the first planar surface 132 to the first convex arcuate surface 112. A second concave blend 210 may extend radially inwardly from the first convex arcuate surface 112, and a first conical surface 136 may extend radially inwardly from the second concave blend 210 to a second convex blend 212. In addition, and a first concave arcuate surface 116 may extend from the second convex blend 212 toward the axis 122 of revolution, forming a dimple 118 that is radially centered about the axis 122 of revolution with a deepest extremity 214 of the dimple 118 disposed at the axis 122 of revolution.

The raised ring 114 may define a radial width 216 and further defines an axial extremity 202 of the body 120 of revolution as previously alluded to herein. The combustion surface 110 may also define an axial dimension 218 measured from the axial extremity 202 of the body 120 of revolution to the deepest extremity 214 of the dimple 118. A ratio of the head diameter 134 to the radial width 216 of the raised ring 114 may range from 4.0 to 12.0, and a ratio of the head diameter 134 to the axial dimension 218 may range from 7.0 to 23.0. In such a case, the radial width 216 of the raised ring 114 may range from 4.0 mm to 15.0 mm, and the axial dimension 218 may range from 2.0 mm to 9.0 mm.

Other relevant dimension of the engine valve 200 may be described as follows with the understanding that these dimensions are measured in a plane containing the radial direction 124 and the axis 122 of revolution such as the plane shown in FIG. 4. The first convex arcuate surface 112 may have a radius of curvature ranging from 5.0 mm to 20.0 mm, the first concave arcuate surface 116 may have a radius of curvature ranging from 5.0 mm to 30.0 mm, and the second convex arcuate surface 138 may have a radius of curvature ranging from 2.5 mm to 10.0 mm. Likewise, the first convex blend 206 may have a radius of curvature ranging from 0.25 mm to 2.0 mm, the first concave blend 208 may have a radius of curvature ranging from 2.0 mm to 8.0 mm, the second concave blend 210 may have a radius of curvature ranging from 1.0 mm to 5.0 mm, and the second convex blend 212 may have a radius of curvature ranging from 2.5 mm to 10.0 mm.

Any of the aforementioned features may be differently configured including ratios, dimensions, shapes, etc. than what has been specifically mentioned herein.

Again with continued reference to FIG. 4, another engine valve 300 that is particularly well suited as a replacement part will now be described.

The combustion surface 110 may include a first concave arcuate surface 116 that is centered on the axis 122 of revolution at a trough point 302, and the first concave arcuate surface 116 may extend circumferentially about the axis 122 of revolution, at least partially forming a dimple 118. A conical surface 304 may extend radially and axially away (i.e. outwardly) from the first concave arcuate surface 116 at an acute angle 140 with the radial direction 124. A convex transitional surface 306 (so called since this surface tangentially transitions between other surfaces) connecting the conical surface 304 to the first concave arcuate surface 316. In some versions of the engine valve 300, the acute angle 140 ranges from 10.0 degrees to 25.0 degrees.

Furthermore, the combustion surface 110 may include a first convex arcuate surface 112 defining at least partially an axial extremity 202 of the body 120 of revolution, and a concave transitional surface 308 extending radially outwardly from the conical surface 304 to the first convex arcuate surface 112, a radially extending flat surface 310 that is interposed radially between the outer lip surface 106 and the first convex arcuate surface 112, an outer convex transitional surface 312 that connects the radially extending flat surface 310 to the outer lip surface 106, and an outer concave transitional surface 314 that connects the radially extending flat surface 310 to the first convex arcuate surface 112.

The outer lip surface 106 may define a head diameter 134. The first concave arcuate surface 116 may define a dimple radial width 316, while the first convex arcuate surface defines 116 may define a raised ring radial width 318. Moreover, the combustion surface 110 may define an axial dimension 218 that is measured from trough point 302 to the axial extremity 202.

A ratio of the head diameter 134 to the dimple radial width 316 may range from 1.0 to 3.5, a ratio of the head diameter 134 to the raised ring radial width 318 may range from 4.0 to 12.0, and a ratio of the head diameter 134 to the axial dimension 218 may range from 7.0 to 23.0. In such a case, the dimple radial width 316 may range from 15.0 mm to 58.0 mm, the raised ring radial width 318 may range from 4.0 mm to 15.0 mm, and the axial dimension 218 may range from 2.0 mm to 9.0 mm.

It should be noted that any of the "transitional" surfaces discussed herein may be similarly or identically dimensioned as the "blends" previously described herein.

As used herein, the term "arcuate surface", "transitional surface", "blend" refers to a physical surface structure, whereas "radius of curvature" means the dimension of a geometric radius of a circle defined at least partially by that physical surface structure. "Arcuate surface", "blend", "transitional surface", etc. in this context could include a single radius or multiple, varying, radiuses, splines, ellipses, etc.

As suggested above, various features and proportions of the different engine valve embodiments may be within common dimensional or proportional ranges, with the illustrated embodiments representing different practical implementation strategies. Other shapes, dimensions, ranges, ratios, etc. are possible in other embodiments of the present disclosure for any engine valve discussed herein.

INDUSTRIAL APPLICABILITY

In practice, a machine, an engine used by the machine, an engine valve, an engine head assembly and/or any combination of these various assemblies and components may be manufactured, bought, or sold to retrofit a machine, or an engine already in the field in an aftermarket context, or alternatively, may be manufactured, bought, sold or otherwise obtained in an OEM (original equipment manufacturer) context.

As alluded to previously herein, the aforementioned embodiments may increase the life of the valve seat insert and/or engine valve while at least maintaining other engine performance(s) as will be elaborated further herein momentarily. In addition, both the problems of "valve recession" as well as engine valve high and low cycle fatigue may be ameliorated simultaneously, breaking the typical compromise (or tradeoff) between these performances.

Figure 6:
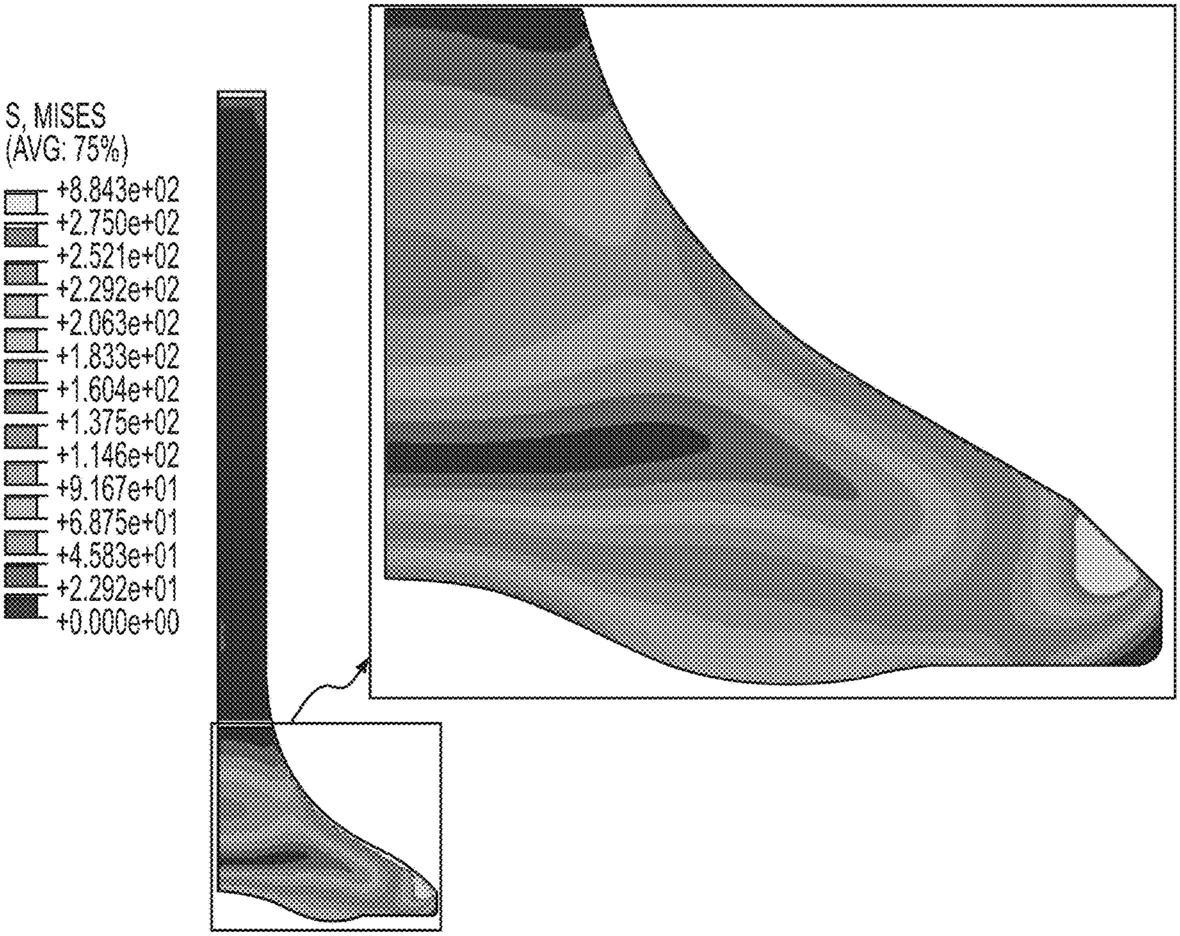
FIG. 6 is a FEA plot showing reduced von-mises stress of half of the engine valve obtained by using the engine valve of FIG. 2.
Figure 7:
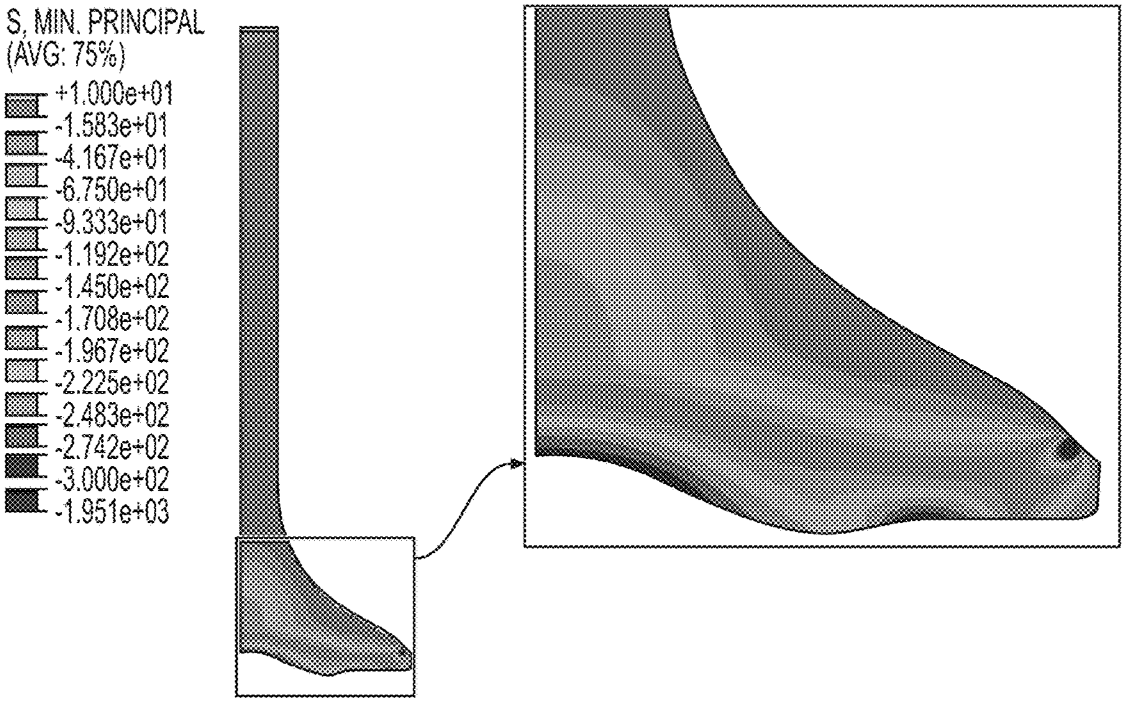
FIG. 7 is a FEA plot showing reduced minimum principal stress of half of the engine valve obtained by using the engine valve of FIG. 2.

Referring now to FIGS. 5 thru 7, the maximum principal stress, von mises stress, and minimum principal stress of the engine valve 100, 200, 300 respectively discussed herein can be seen. Compared to previous engine valve designs that lack a raised ring or a dimple, the stresses remain the same or even less, even though less material is required to manufacture the engine valve. Thus, fatigue is ameliorated with the new design for the engine valve while less material is required to make the engine valve, breaking the typical compromise between the cost of the valve and its performance.

Figure 8:
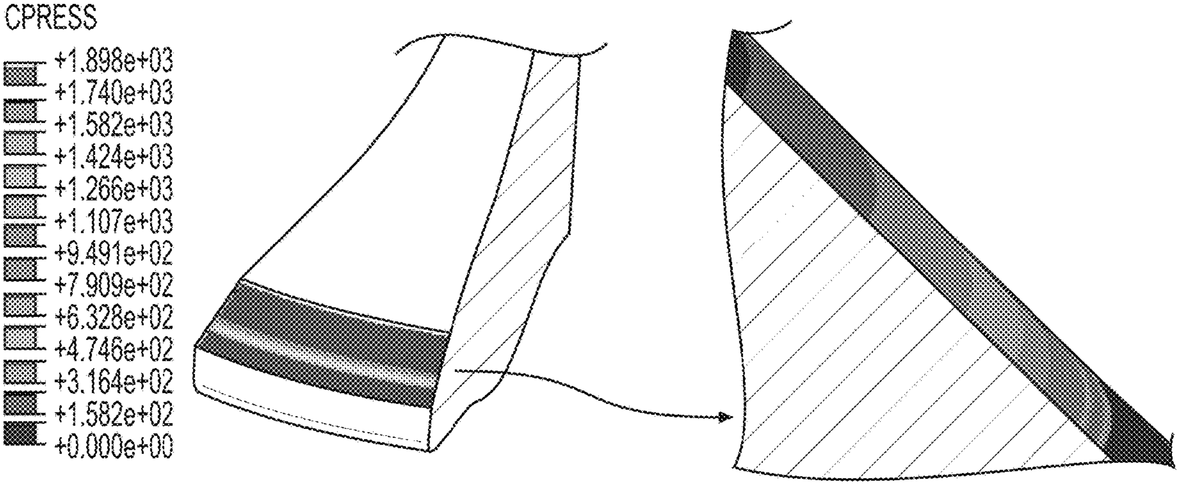
FIG. 8 is a FEA plot showing reduced contact pressure on a portion of the surface of the engine valve that contacts the valve seat insert obtained by using the engine valve of FIG. 2.

FIG. 8 shows the contact pressure exerted on the new engine valve 100, 200, 300. When compared to the contact pressure exerted on previous engine valve designs, it can be seen that the contact pressure has been decreased by as much as 50% or more. So, one skilled in the art would expect that the problem of valve recession is ameliorated by the new engine valve 100, 200, 300 design while the amount of material necessary to manufacture the engine valve has been reduced. Again, the typical compromise between the cost of the valve and its performance has been broken by the new engine valve design.

Figure 9:
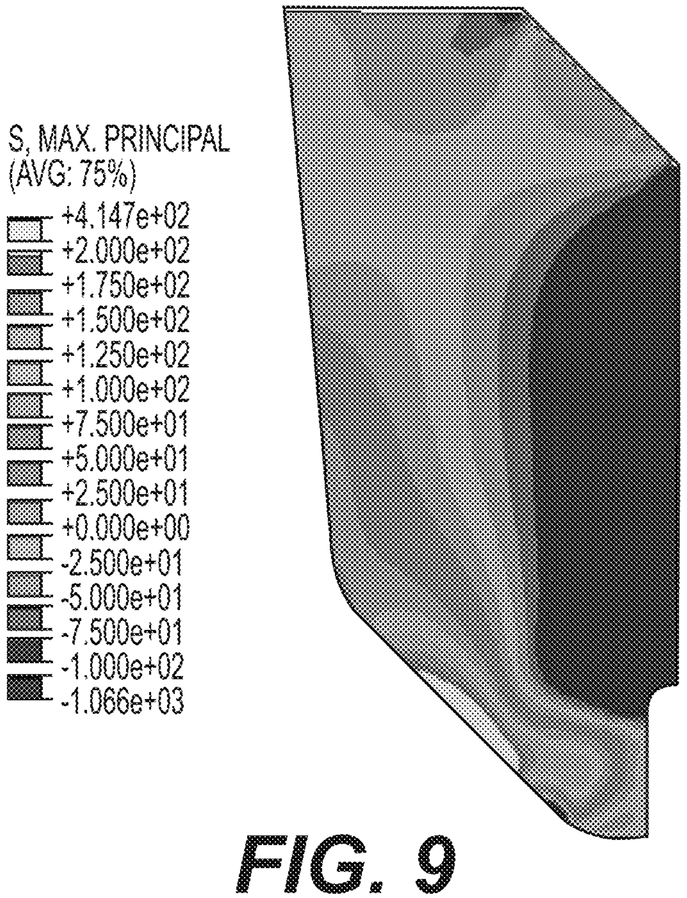
FIG. 9 is a FEA plot showing reduced maximum principal stress on the valve seat insert obtained by using the engine valve of FIG. 2 shown internally on a cross-section of the valve seat insert.
Figure 10:
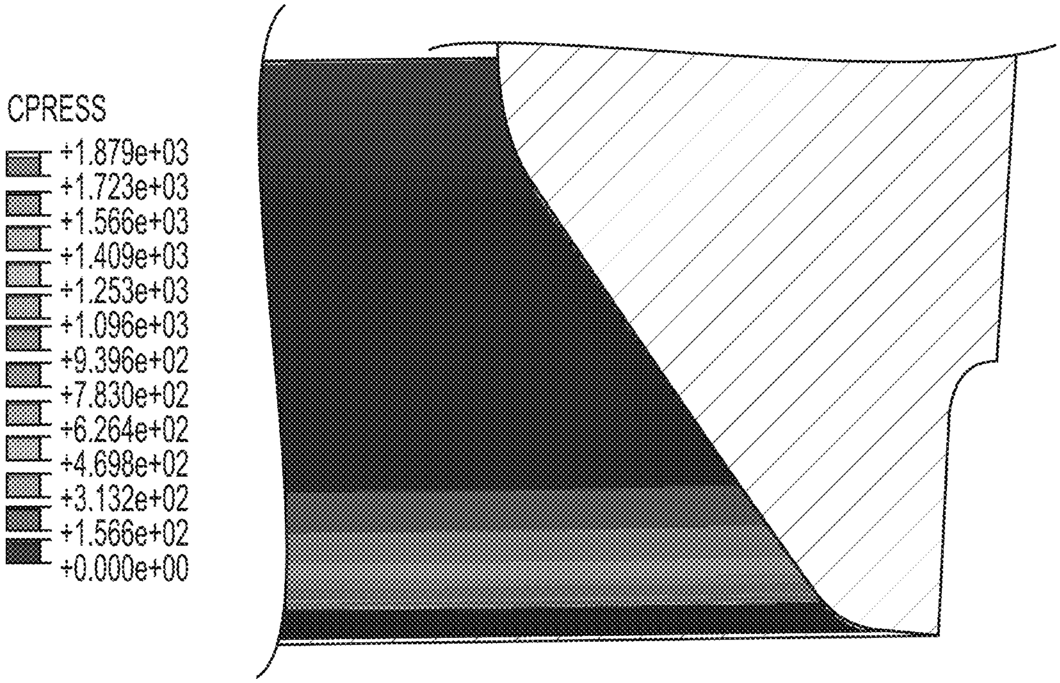
FIG. 10 is a FEA plot showing reduced contact pressure on a portion of surface of the valve seat insert that contacts the engine valve obtained by using the engine valve of FIG. 2.

FIGS. 9 and 10 depict the maximum principal stress and contact pressure exerted on valve seat inserts by the new engine valve 100, 200, 300. An improvement is also desired for the maximum principal stress and contact pressure on the valve seat insert. Otherwise, valve seat insert fatigue and/or valve recession may occur due to problems with the valve seat insert, which would necessitate engine repair and downtime for the engine or the machine using the engine. These plots reveal that maximum principal stress remains relatively the same while the contact pressure is also reduced by as much as 40% or more. This too shows that the typical compromise between the cost of the valve and its performance has been broken by the new engine valve design.

In summary, as evidenced by the plots just described, the proper balance between the stiffness versus the flexibility of the engine valve may be provided using a raised ring, a dimple, or both in various embodiments of the present disclosure so that the contact pressures are reduced an appropriate amount without needing to adjust the geometry of the valve seat insert or compromise its performance such as the ingress or egress of air or exhaust, etc.

Other embodiments of an engine valve of the present disclosure that may be similarly constructed and have similar characteristics to those just described will now be discussed with reference to FIGS. 11 thru 13.

In FIG. 11, the engine valve 400 may be configured similarly or identically to engine valve 200, 300 previously described herein except for the following differences. For example, a planar surface 452 is provided between the dimple 418 and the raised ring 414 that is parallel to the radial direction instead of a conical surface. Also, the raised ring 414 is not constructed solely from a convex arcuate surface but instead is formed by a plurality of segments including a flat apex surface 450 that along with the first convex arcuate surface 412, defines an axial extremity 402 of the engine valve 400. A blend or transitional surface is also omitted between the first planar surface 432 and the outer lip surface 406. Instead a sharp point 454 is provided. In addition, the angle 456 that the conical seating surface 444 makes with the radial direction is more pronounced for this embodiment than that of FIG. 4.

In FIG. 12, the engine valve 500 is similarly constructed to that of FIG. 11 except that raised ring radial width 518 is greater than that of FIG. 11, so that the raised ring 514 is spaced away from the first concave arcuate surface 516 (forming the dimple) a distance 558 that is less than that of FIG. 11.

In FIG. 13, the engine valve 600 is similarly constructed to the that of FIGS. 11 and 12 except that the first radial distance 628 and the raised ring radial width 618 have been adjusted so that the planar surface or conical surface interposed radially between the raised ring and the dimple has been omitted such that the dimple transitions directly to the raised ring. Other configurations are possible in other embodiments of the present disclosure.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

As used herein, the articles “a” and “an” are intended to include one or more items, and may be used interchangeably with “one or more.” Where only one item is intended, the term “one” or similar language is used. Also, as used herein, the terms “has,” “have,” “having,” or the like are intended to be open-ended terms. Further, the phrase “based on” is intended to mean “based, at least in part, on” unless explicitly stated otherwise.

Recitation of ranges of values herein are merely intended to serve as a shorthand method of referring individually to each separate value falling within the range, unless otherwise indicated herein, and each separate value is incorporated into the specification as if it were individually recited herein.

Some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An engine head assembly for an internal combustion engine comprising:

an engine head having a fluid conduit formed therein; and an engine valve including a stem, a head comprising an outer lip surface, a seating surface interposed between the stem and the outer lip surface, and a combustion surface extending from the outer lip surface on the opposite side of the head as compared to the seating surface;

wherein the combustion surface includes a first convex arcuate surface spaced away from the outer lip surface, at least partially forming a raised ring, and a first concave arcuate surface spaced away from the outer lip surface, at least partially forming a dimple, and the engine valve includes a body of revolution, defining an axis of revolution, and wherein the raised ring defines a lower axial extremity of the engine valve and the dimple defines an upper axial extremity of the combustion surface.

2. The engine head assembly of claim 1 wherein the body of revolution of the engine valve, defines a radial direction perpendicular to the axis of revolution, and a circumferential direction about the axis of revolution, and the raised ring and the dimple extend circumferentially about the axis of revolution.

3. The engine head assembly of claim 2 wherein the first convex arcuate surface is spaced away a first radial distance from the outer lip surface, and the first concave arcuate surface is spaced away from the outer lip surface a second radial distance from the outer lip surface that is greater than the first radial distance.

4. The engine head assembly of claim 3 wherein the combustion surface further comprises a first planar surface that extends radially inwardly from the outer lip surface toward the first convex arcuate surface.

5. The engine head assembly of claim 4 wherein the first planar surface is perpendicular to a direction parallel to the axis of revolution.

6. The engine head assembly of claim 5 wherein the outer lip surface defines a head diameter, and a ratio of the head diameter to the first radial distance ranges from 5.0 to 10.0.

7. The engine head assembly of claim 6 wherein the combustion surface further comprises a first conical surface extending radially and axially inwardly from the first convex arcuate surface toward the first concave arcuate surface, and a second convex arcuate surface that connects the first conical surface to the first concave arcuate surface.

8. The engine head assembly of claim 7 wherein the first conical surface forms an acute angle with the radial direction in a plane containing the radial direction and the axis of revolution, and a ratio of the head diameter to the second radial distance ranges from 2.5 to 3.0.

9. The engine head assembly of claim 8 further wherein the acute angle ranges from 10.0 degrees to 25.0 degrees, the first radial distance ranges from 3.0 mm to 12.0 mm, and the second radial distance ranges from 12.0 mm to 25.0 mm.

10. The engine head assembly of claim 2 wherein the stem includes a stem cylindrical surface, the seating surface includes a conical seating surface extending radially inwardly from the outer lip surface, and an arcuate seating surface extending radially inwardly from the conical seating surface to the stem cylindrical surface, the outer lip surface is cylindrical; and the raised ring is also partially formed by a flat apex surface.

11. An engine valve comprising:

a body of revolution, defining an axis of revolution, a radial direction perpendicular to the axis of revolution, and a circumferential direction about the axis of revolution, the body of revolution including a stem, a head comprising an outer lip surface, a seating surface extending radially and axially inwardly from the outer lip surface toward the stem, and a combustion surface extending from the outer lip surface on the opposite side of the head as compared to the seating surface; and wherein the combustion surface includes a first convex arcuate surface spaced away from the outer lip surface a first radial distance, at least partially forming a raised ring extending circumferentially about the axis of revolution and defining an axial extremity of the body of revolution, and a first planar surface extending radially inwardly from the outer lip surface toward the first convex arcuate surface and perpendicularly to a direction parallel with the axis of revolution;

the raised ring defining a radial width, and an inside diameter dimension radially inward of the first convex arcuate surface and extending through the axis of revolution, and the inside diameter dimension is larger than the radial width.

12. The engine valve of claim 11 wherein the outer lip surface defines a head diameter, and a ratio of the head diameter to the first radial distance ranges from 5.0 to 10.0.

13. The engine valve of claim 12 wherein the first radial distance ranges from 3.0 mm to 12.0 mm.

14. The engine valve of claim 13 wherein the combustion surface further comprises a first convex blend connecting the outer lip surface to the first planar surface, a first concave blend connecting the first planar surface to the first convex arcuate surface, a second concave blend extending radially inwardly from the first convex arcuate surface, a first conical surface extending radially inwardly from the second concave blend to a second convex blend, and a first concave arcuate surface extending from the second convex blend toward the axis of revolution, forming a dimple radially centered about the axis of revolution with a deepest extremity of the dimple disposed at the axis of revolution;

the combustion surface defines an axial dimension measured from the axial extremity of the body of revolution to the deepest extremity of the dimple;

a ratio of the head diameter to the radial width of the raised ring ranges from 4.0 to 12.0; and a ratio of the head diameter to the axial dimension ranges from 7.0 to 23.0.

15. The engine valve of claim 14 wherein the radial width of the raised ring ranges from 4.0 mm to 15.0 mm, and the axial dimension ranges from 2.0 mm to 9.0 mm.

16. An engine valve comprising:

a body of revolution, defining an axis of revolution, a radial direction perpendicular to the axis of revolution, and a circumferential direction about the axis of revolution, the body of revolution including a stem, a head comprising an outer lip surface, a seating surface extending radially and axially inwardly from the outer lip surface toward the stem, and a combustion surface extending from the outer lip surface on the opposite side of the head as compared to the seating surface; and wherein the combustion surface includes a first concave arcuate surface centered on the axis of revolution at a trough point, the first concave arcuate surface extending circumferentially about the axis of revolution, at least partially forming a dimple, a conical surface or a planar surface extending radially away from the first concave arcuate surface, and a convex transitional surface connecting the conical surface or the planar surface to the first concave arcuate surface, and the combustion surface includes a first convex arcuate surface defining at least partially an axial extremity of the body of revolution.

17. The engine valve of claim 16 wherein the conical surface or the planar surface is a conical surface that forms an acute angle with the radial direction that ranges from 10.0 degrees to 25.0 degrees.

18. The engine valve of claim 16 wherein the combustion surface includes a concave transitional surface extending radially outwardly from the conical surface to the first convex arcuate surface, a radially extending flat surface interposed radially between the outer lip surface and the first convex arcuate surface, an outer convex transitional surface connecting the radially extending flat surface to the outer lip surface, and an outer concave transitional surface connecting the radially extending flat surface to the first convex arcuate surface.

19. The engine valve of claim 18 wherein the outer lip surface defines a head diameter, the first concave arcuate surface defines a dimple radial width, the first convex arcuate surface at least partially defines a raised ring having a raised ring radial width, the combustion surface defines an axial dimension measured from trough point to the axial extremity, a ratio of the head diameter to the dimple radial width ranges from 1.0 to 3.5, a ratio of the head diameter to the raised ring radial width ranges from 4.0 to 12.0, and a ratio of the head diameter to the axial dimension ranges from 7.0 to 23.0.

20. The engine valve of claim 19 wherein the dimple radial width ranges from 15.0 mm to 58.0 mm, the raised ring radial width ranges from 4.0 mm to 15.0 mm, and the axial dimension ranges from 2.0 mm to 9.0 mm.

* * * * *